United States Patent [19]

Dziedzic et al.

[11] Patent Number: 4,482,023

[45] Date of Patent: Nov. 13, 1984

[54] SELF-LOOKING PORTABLE PANEL

[75] Inventors: Leo M. Dziedzic, Downers Grove; Lloyd B. Idelman, Evanston; Lawrence M. Sobol, Hinsdale, all of Ill.

[73] Assignee: International Harvester Co., Chicago, Ill.

[21] Appl. No.: 379,430

[22] Filed: May 18, 1982

[51] Int. Cl.[3] .............................................. B62D 25/12

[52] U.S. Cl. .................................. 180/89.17; 16/262; 49/465; 296/148

[58] Field of Search ......................... 49/465, 394, 395; 16/262, 270, 386, 258, 263, 259; 296/148; 292/42, 162, DIG. 14; 180/69.2, 89.17

[56] References Cited

U.S. PATENT DOCUMENTS

| | | | |
|---|---|---|---|
| 1,425,995 | 8/1922 | McGiveney | 16/258 |
| 1,757,021 | 5/1930 | Remondino | 292/DIG. 14 |
| 3,270,462 | 9/1966 | Obadal | 49/465 |

FOREIGN PATENT DOCUMENTS

| | | | |
|---|---|---|---|
| 1338240 | 8/1963 | France | 16/386 |
| 168194 | 9/1921 | United Kingdom | 292/42 |

*Primary Examiner*—David M. Mitchell
*Assistant Examiner*—Joseph G. McCarthy
*Attorney, Agent, or Firm*—Boris Parad; F. David Au Buchon

[57] ABSTRACT

A self-locking portable panel having an impact actuated and self-locking hinge mechanism at one end thereof and a latch at another.

7 Claims, 18 Drawing Figures

Fig. 16
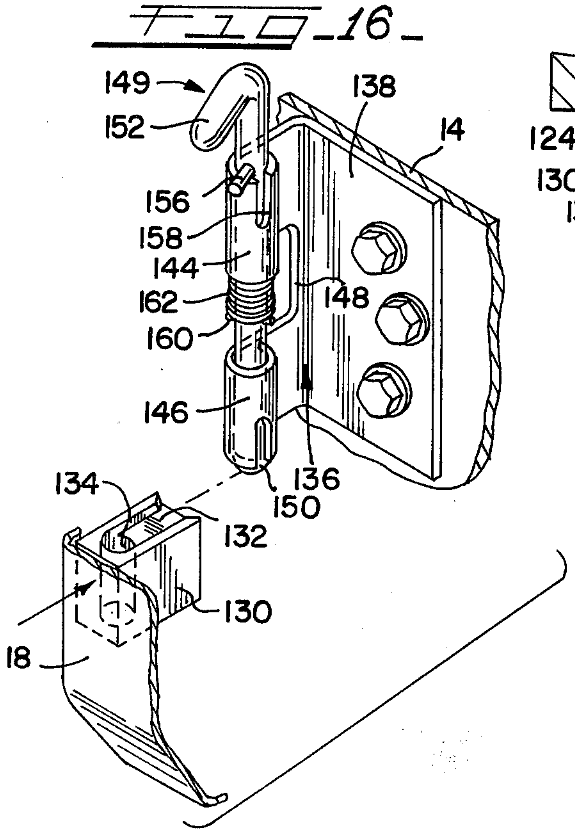
Fig. 15
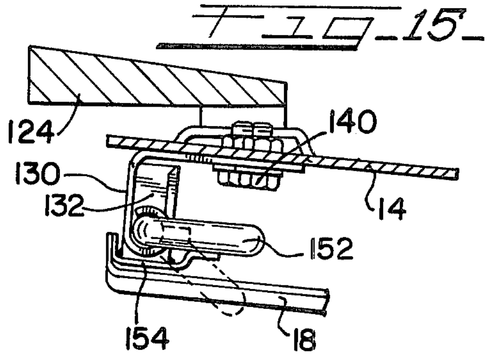
Fig. 17
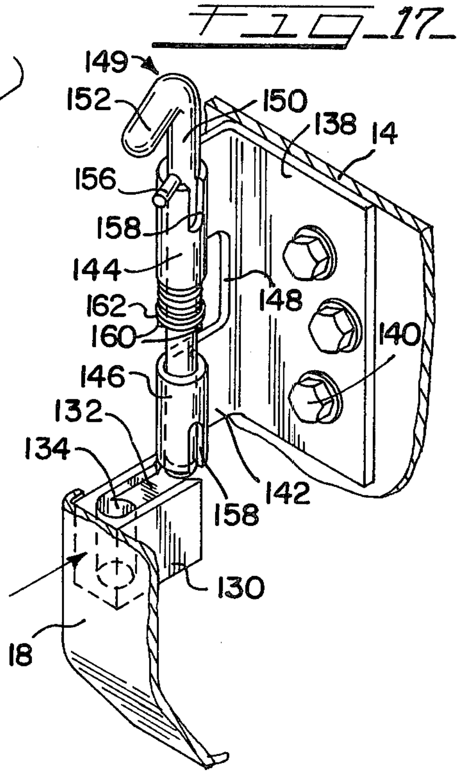
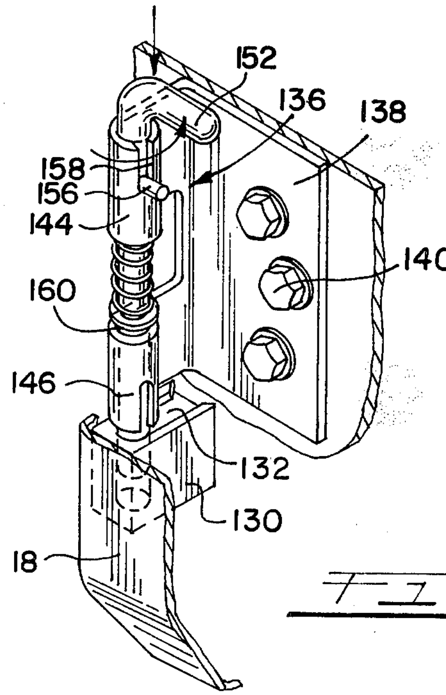
Fig. 18

SELF-LOOKING PORTABLE PANEL

BACKGROUND OF THE INVENTION

1. Field of the Invention

This invention pertains to hinge mechanisms and more particularly to a portable panel for a motor vehicle permitting a detachable connection thereof and automatic self-locking upon reassembly thereof.

2. Description of the Prior Art

The prior art is replete with various arrangements for hinge mechanisms. For example, the tractor hood can be rotated upon hinges installed in the front end thereof, as shown in the submitted brochure illustration.

However, none of the prior art references known to the Applicants at this time describes, illustrates or suggests the novel snap-on self-locking panel as disclosed in the subject invention.

SUMMARY OF THE INVENTION

According to the present invention, a motor vehicle has a hood wall and a panel opening therein. A portable panel covers the panel opening. The panel is flush-mounted with the hood wall. The panel is releasably secured to the hood wall by at least one disconnectable hinge mechanism at first end thereof. And second end of the panel is able to swing about the hinge mechanism. The panel has outer side and inner side facing the interior of the hood. The hinge mechanism functions as an impact-actuated and self-locking assembly for automatic snap-on connection of the panel to and swinging about the hood wall. The hinge mechanism comprises one fixed part to receive and coact with another mechanism part for facilitating this swinging movement of the panel about the fixed part. Another mechanism part comprises a rotatable finger tab element which is spring loaded and lockingly engageable with the fixed part. The finger tab rotation and subsequent locking engagement of the parts is actuated by initial alignment of the parts and subsequent locking thereof by the finger tab.

DESCRIPTION OF THE DRAWINGS

FIG. 15 is a cross-sectional view of the hinge mechanism taken substantially along the lines 15—15 in FIG. 14;

FIG. 16 is an illustrative perspective view showing the disassembled hinge mechanism;

FIG. 17 showing the intermediate stage of the hinge mechanism locking operation; and FIG. 18 is a perspective view showing the panel hinge mechanism being completely assembled.

The first embodiment is not perceived to be a part of the invention.

DESCRIPTION OF THE FIRST EMBODIMENT

The invention may be carried in the practice in a number of ways but two specific embodiments will be described by way of example only. The first embodiment is not considered to be a part of the subject invention and is recited only for illustrative purposes.

Figure 1:
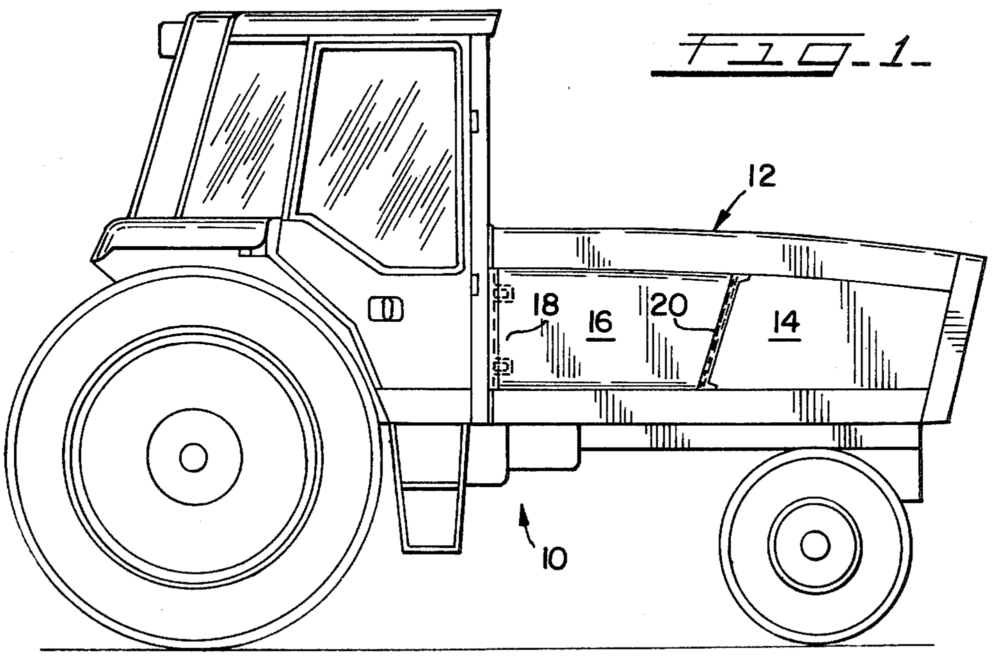
FIG. 1 is a side view of a tractor having a hood wall and a portable panel mounted thereon.
Figure 2:
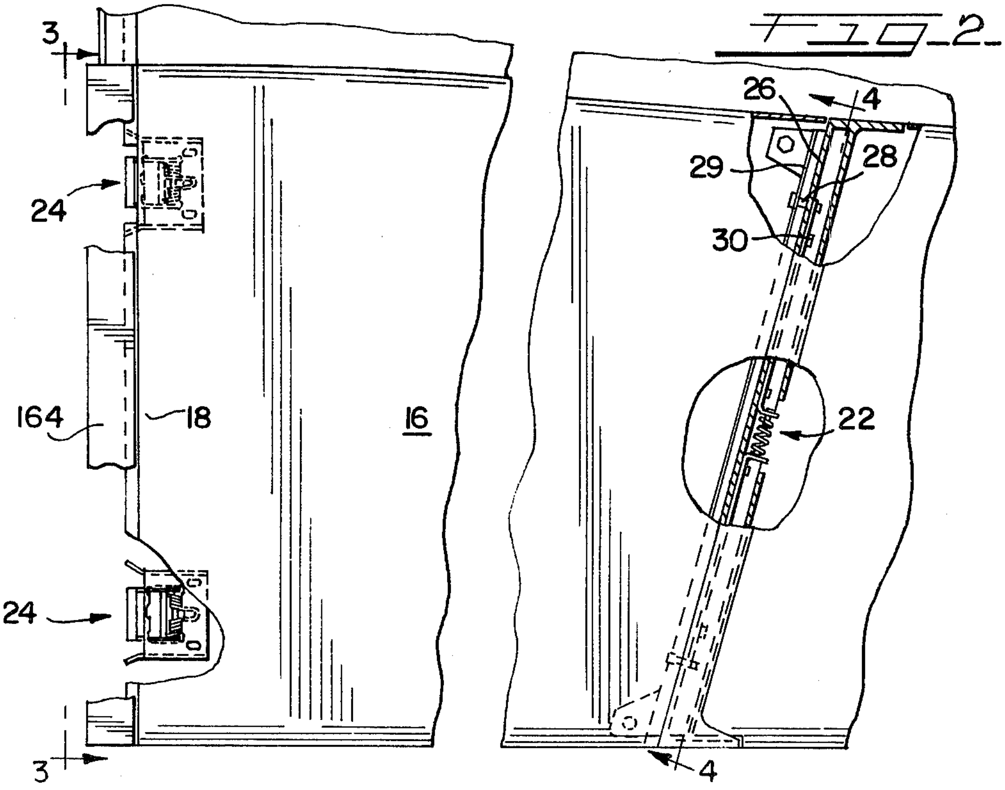
FIG. 2 is an enlarged fragmentary view of the portable panel.
Figure 3:
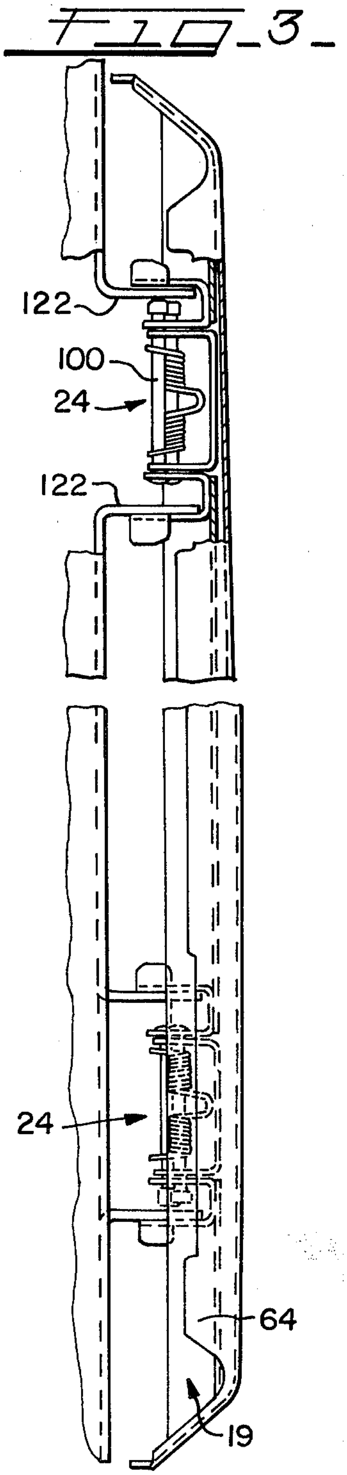
FIG. 3 is an elevation view of the portable panel and hinge mechanisms taken substantially along the lines 3—3 in FIG. 2.

This invention relates to an access engine compartment panel with a simple latch and quickly disconnectable hinge. Referring now to the drawings, wherein reference characters designate like or corresponding parts throughout the several views, there is shown in FIG. 1 a tractor 10. FIG. 1 illustrates an application of the subject panel with a disconnectable hinge mechanism. The tractor 10 has a hood 12 and a hood wall 14 to which a portable panel 16 is attached. The panel 16 is slightly offset from the hood wall 14, so that the center portion of the panel 16 forms an offset 19. The appearance of the offset 19 on the tractor makes an impression of an air scoop on the tractor body. The second end 20 of the portable panel 16 is attached to the tractor body or a continuation of the hood wall 14. A latch 22 is disposed within the boundries of the false air scoop 19 for locking the second end 20 to the hood wall 14. The latch 22 is located in a recess 23 in the offset 19. The first end 18 is attached to the tractor body of wall 14 by virtue of hinge mechanisms 24, as shown in FIGS. 2 and 3.

Figure 4:
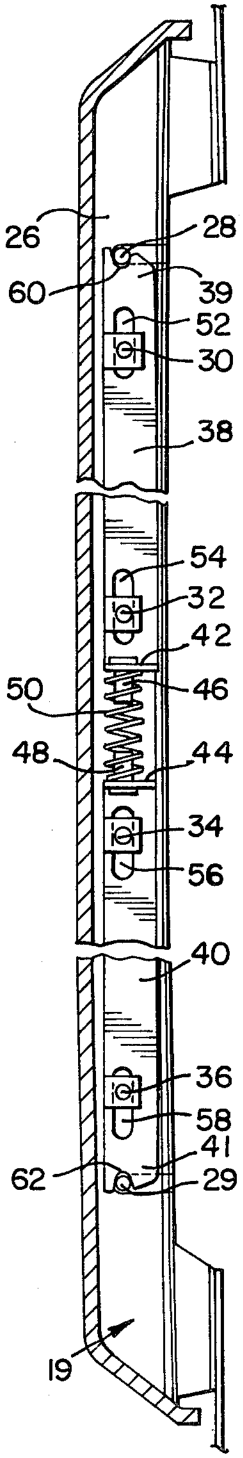
FIG. 4 is an elevation view of the panel and the latch thereon taken substantially along the lines 4—4 in FIG. 2.

As best shown in FIG. 4, the latch 22 comprises a keeper 28 extending outwardly from the flange 29 projecting outwardly from the wall 14. Guide fingers 30, 32, 34, and 36, project outwardly of the frame 26. A narrow plate 38 having a camber portion 39 at the edge thereof contiguously abuts and slides along the frame 26. The plate 38 has a symmetrical counterpart, plate 40, with its camber portion 41 at the opposite edge thereof. The plates 38 and 40 have facing each other edge flanges 42 and 44, respectively, extending outwardly of said plates and parallel to each other. A stud 46, rigidly attached to the flange 42, and a stud 48, rigidly attached to the flange 44, support and move within the compression spring 50. The plate 38 includes elongated slots 52 and 54 for the reciprocal movement of the guide fingers 30 and 32, respectively, within them. The plate 40 also has slots 56 and 58 serving the same function for the guide fingers 34 and 36. Ajacent to the camber portion 39 in the plate 38 there is a notch 60 adapted to receive the keeper 28 and the plate 40 also has a notch 62 adapted to receive the keeper 63. The latch 22 automatically locks the panel 16 to the hood wall 14 when the panel is pressed against the wall 14. The pressure applied to the panel is transferred to the camber portion 39 and 41 contacting keepers 28 and 63, Thereby pushing the plates 38 and 40 toward each other and compressing the spring 50. When the keepers 28 and 63 pass the camber portion 39 and 41, respectively, the spring loaded plate 38 and 40 trap the keepers 28 and 63 in their notches 60 and 62, thereby locking the panel 16 to the wall 14. In order to unlock the latch 22, an operator squeezes the spring 50 by pushing flanges 40 and 42 toward each other, thereby releasing the locking engagement of keepers and notches and letting the panel 16 to swing open from the wall 14.

Referring now to the FIGS. 3, 5, 6 and 10, wherein the hinge mechanism 24 is shown in an enlarged form. The hinge mechanism 24 is partially covered by a panel lip 64 and enclosing the panel first end 18 offset. The hinge mechanism 24 comprises a hinge base plate 66 having an essentially U-shaped configuration. The plate 66 is rigidly attached to the panel 16 by ball headed coupling bolts 68 protruding through the base plate slots 70. The plate 66 has a mount platform 72 interconnecting sidewalls 74 and 76. The sidewall 74 has a projecting outwardly prong 78 and sidewall 76 has a prong 80. Both of the prongs 78 and 80 extend outwardly of the mount platform 72 and divergingly inclined from each other.

The platform 72 has two upright flanges 86 and 88 symmetrically opposed to each other. The flanges 86 and 88 have apertures 90 and 92, respectively, adapted to receive a support pin 94 projecting therethrough. The flanges 86 and 88 also have triangular openings 96 and 98, respectively, adapted to receive a sliding pin 100 moveable therewithin. A coil spring 102 is mounted on the pin 94 with its center anchor loop 104 pushing against the base platform 72. The spring coil wire ends 106 rest against the pin 100, thereby constantly applying predetermined pressure thereon.

A finger tab 108 is spaced between and moveably attached to the flanges 86 and 88. The tab 108 includes slanted slots 110 adapted to receive the support pin 94 projecting therethrough, and openings 112 for the slide pin 100 projecting therethrough. The sidewalls 114 of the finger tab 108 are interconnected by a link 116 in a U-shape fashion. Each of the sidewalls 112 has a recess 118 adapted to receive a hinge pin 120 mounted on brackets 122, which extend outwardly from the tractor body 124.

Figures 5, 6, 7, 8, 9, 10:
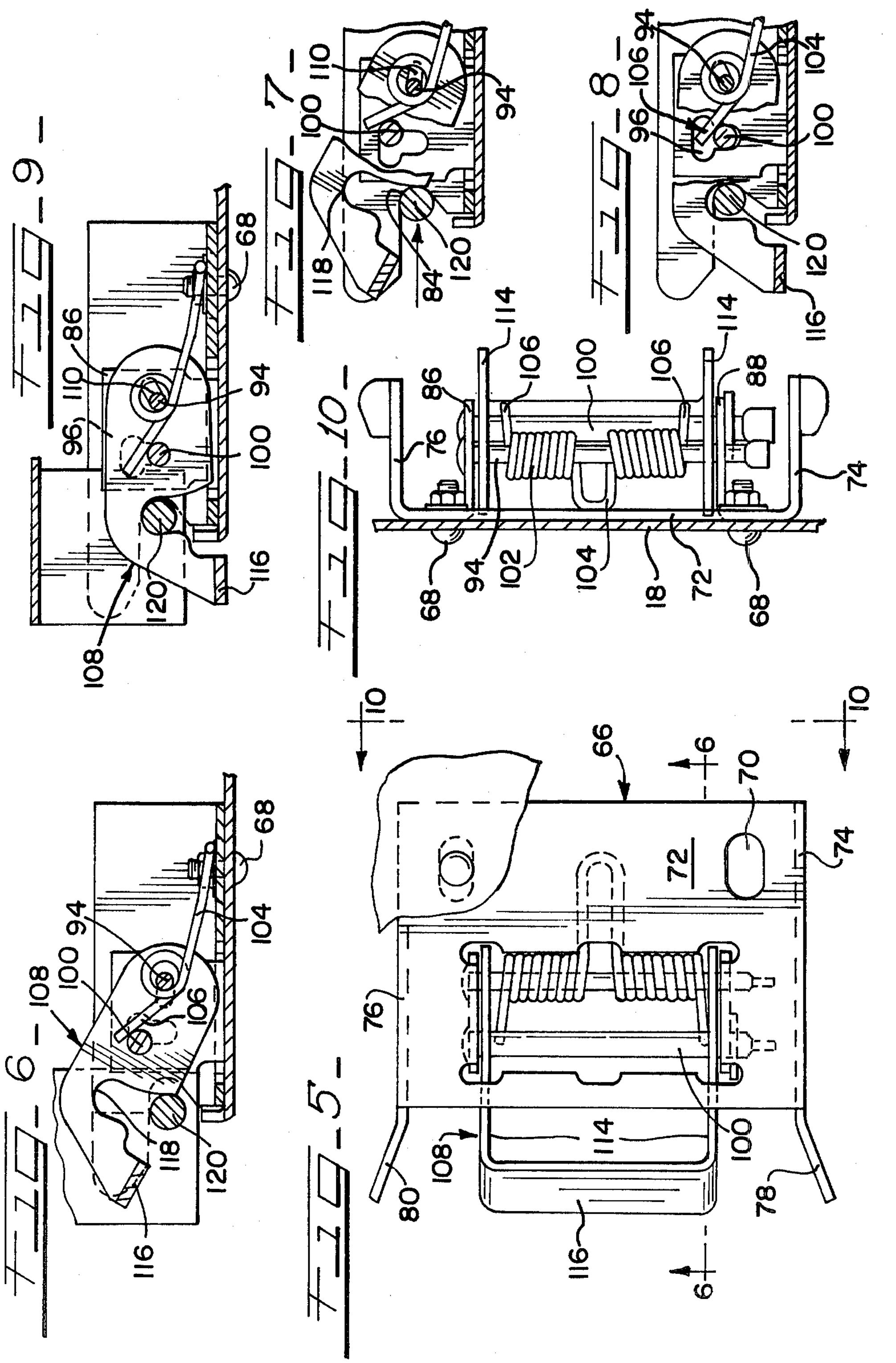
FIG. 5 is an enlarged break-away top view of the hinge mechanism as described in the first embodiment.
FIGS. 6, 7, 8 and 9 are a cross-sectional view of the hinge mechanism taken substantially along the line 6—6 in FIG. 5 illustrating the sequence of the range mechanism locking engagement.
FIG. 10 is a bottom view of the hinge mechanism in its first embodiment.
Figure 12:
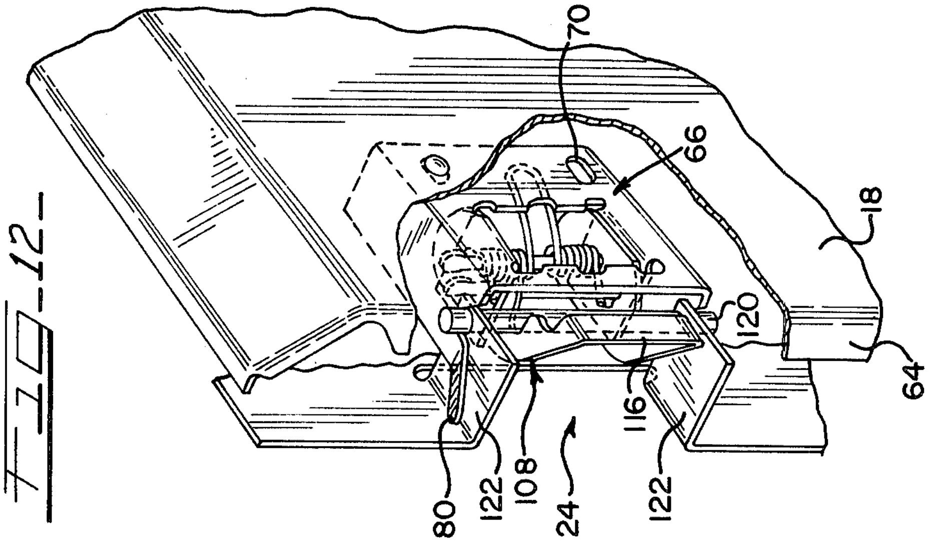
FIG. 12 is a perspective and illustrative view of the panel hinge mechanism shown in its complete assembly.
Figure 11:
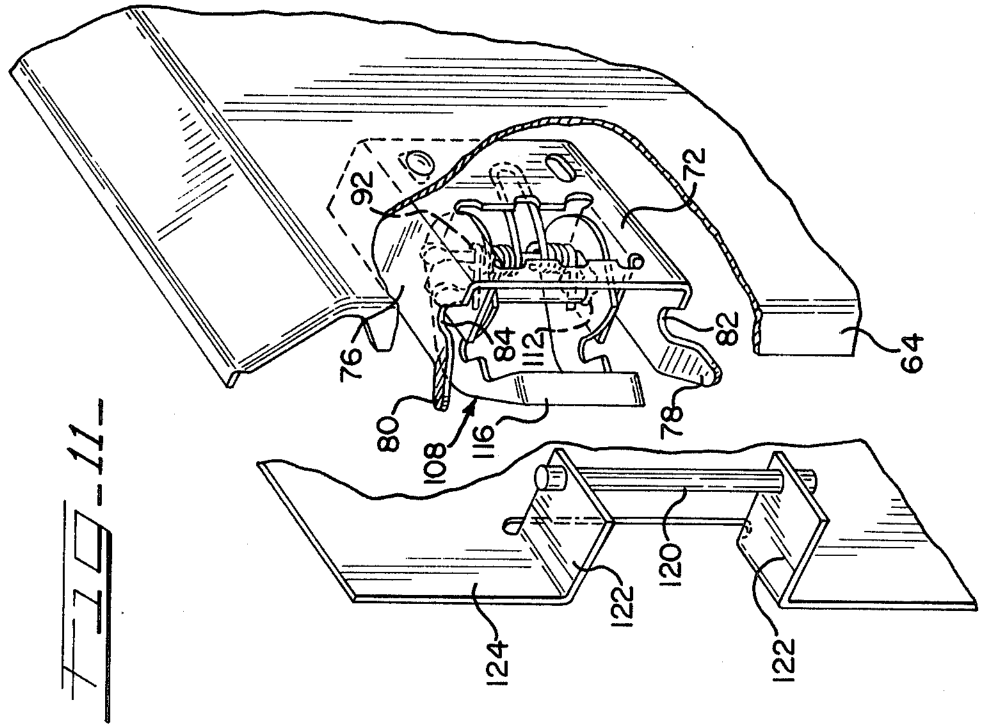
FIG. 11 is a perspective, illustrative view of the disassembled hinge mechanism.
Figure 13:
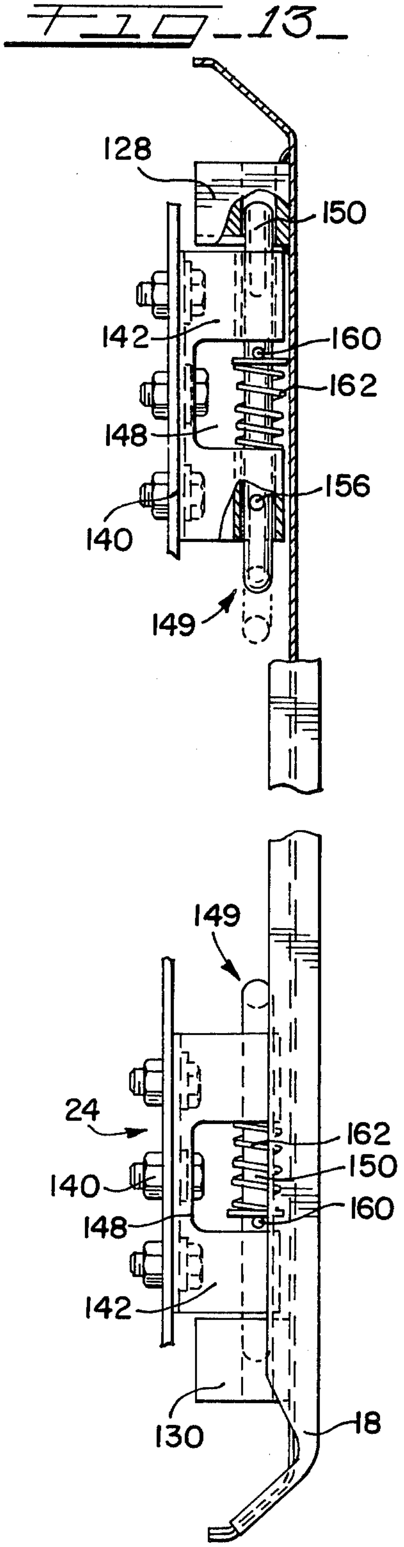
FIG. 13 is a side view of the panel with a hinge mechanism shown in its second embodiment.
Figure 14:
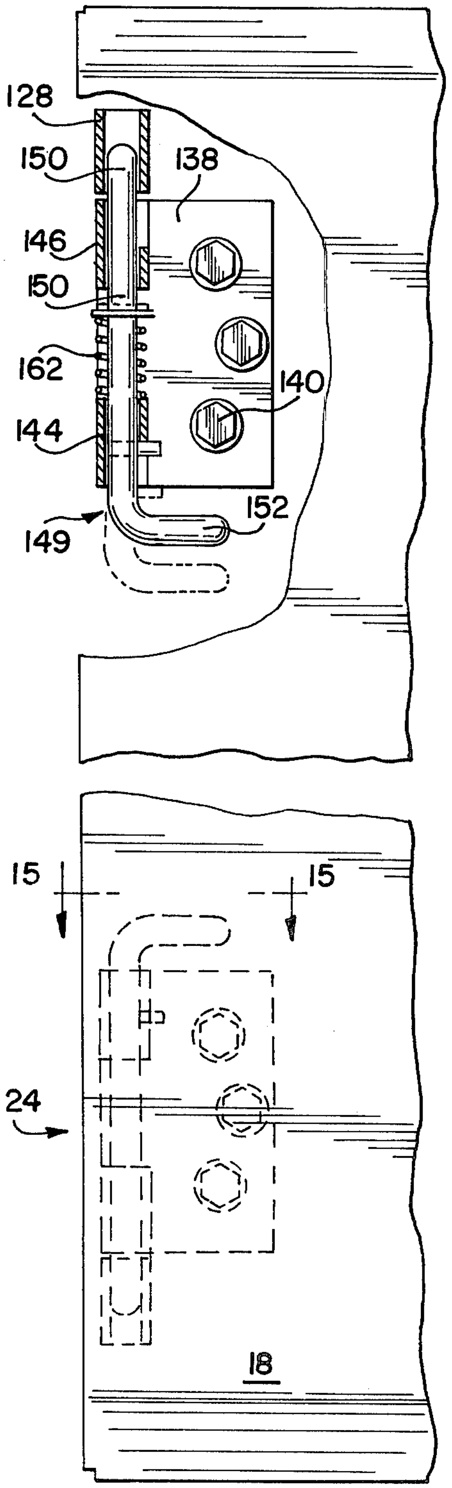
FIG. 14 is another side view of the hinge mechanism in its second embodiment.

The operation of the hinge mechanism is illustrated in FIGS. 6, 7, 8 and 9. As the initial step of locking the panel 16 to the tractor body 124, the hinge mechanisms 24 are aligned with the hinge pins 120. The operation of the upper mechanism is identical to that of the lower mechanism. The prongs 78 and 80 help to guide the hinge plates 66 toward the hinge pins 120 by sliding on top of the brackets 122, as best shown in FIG. 12. FIG. 6 illustrates an initial contact of the hinge pin 120 and finger tab side wall 114. At this stage the sliding pin 100 is located in the upper left corner of the triangular openings 96 and 98 in the flangas 86 and 88. The pin 100 location in that corner is necessitated by force of the spring projecting ends 106 applied to it. At the next stage the pin 100 is moved into the upper right corner and the sidewall 114 moving across the pin 94 along slanted slots 110 to the right. The continuous sliding of the hinge pin 120 into the recess 118 is concomitant with the movement of the sliding pin 100 into the lower corner of the triangular opening 96 under the force of the spring ends 106. The completed locking engagement is shown in FIGS. 9 and 12.

The disengagement of the panel from the attachment to the tractor body 124 is carried out by finger pressure application to the finger tab 108 at its link section 116. Under the pressure the finger tab 108 starts to move upwardly relieving the grasp of the recess 118 around the hinge pin 120. The sliding pin 100 is forced to move upwardly until under the force of the spring 102 it is pushed into the upper left corner where it stays in the panel disengaged position. Thus, the finger tab 108 is locked in the open position by the force of the projecting ends 106 forcing the pin 100 to stay in the upper left corner of openings 96 and 98 not permitting the finger tab 108 to go down. As is evident from the above, the spring 102 serves two functions, one is holding the finger tab 108 in the open position and also holding it in the closed position.

DESCRIPTION OF THE SECOND EMBODIMENT

As best shown in FIGS. 13, 15, 16, 17 and 18, the hinge mechanisms 24, usually a pair of them, have symmetrically opposite disposition on the panel 16 and the parts corresponding thereto on the tractor body 124. The structure of the hinge mechanism 24 comprises a hinge block 128 for the upper location of the hinge mechanism and 130 for the lower hinge mechanism. For illustrative purposes the lower hinge mechanism 124 will be discussed. The hinge block 130 includes an essentially horizontal recessed ramp 132 and a vertical bore 134 communicating with the recessed ramp 132. An angle-shaped bracket 136 is attached to the tractor body 124. This is accomplished by rigidly securing the flange 138 of the bracket 136 to the tractor body 124 by screws 140 or other suitable mechanical means. The flange 142 extending transversely to the flange 138 has rolled in edge forming an upper hollow cylinder 144 and a lower hollow cylinder 146 spaced apart by a U-shaped cut-out in the flange 142. A finger tab 149 includes a slide pin 150 with a crank arm 152. The pin 150 projects through both cylinders 144 and 146. The crank arm 152 is rotatable by a striker 154 rigidly attached to the panel 16, as shown in FIG. 15. The slide pin 150 is provided with a peg 156 extending outwardly therefrom. The peg 156 rests on top of the cylinder 144 in the panel unlocked position and slideably moves into a groove 158 in the cylinder 144, when the panel 16 is locked to the wall 14. The analogous groove 158 is oppositely and symmetrically located in the cylinder 146 but it has no application in operation of the lower hinge mechanism 124, as it is utilized only when the bracket 138 is used for the upper hinge mechanism. A dowel 160 projects through the slide pin 150 between the cylinders 144 and 146. A pull-back spring 162 is disposed between the dowel 160 and upper cylinder 144 for urging the slide pin 150 to move downwardly by applying the spring force to the dowel 160.

An elastic cover 164 is attached to the tractor body 124 and covers the portion of the panel first end 18 and the edge of the tractor body 124 or the wall 14, so as to prevent an admission of dust, dirt and other foreign matters into the engine department of the tractor. The cover 164 is simply pushed inwardly when it is necessary to reach a finger tab as described in the first embodiment.

In operation, the removed panel is aligned with the mount bracket 138 by virtue of hinge blocks 128 and 130 contacts with the sliding pins 150 mounted on the brackets 138. An essentially horizontal recess ramp 132 slides on the lower cylinder 146 while a striker 154 on the panel 16 intimately engages the crank arm 152. After the initial alignment of cylinder 146 and ramp 132, the cylinder 146 is moved toward the vertical bore 134. Thereafter, the striker 154 following the swinging movement of the panel 16 toward the wall 14 causes the finger tab 149 to rotate about its axis. The peg 156 resting against the top of the cylinder 144 rotates together with the crank arm 152 until it will reach the groove 158. The force of the spring 162 will urge the dowel 160 and, consequently the sliding pin 150, to move downwardly until the peg 156 reaches the bottom of the groove 158. The slide pin 150 can move downwardly only at the time when the hinge block 130 is moved completely to a position wherein the lower cylinder 146 is sitting on top of the vertical bore 134. Hence, in the locking position the slide pin is housed in the vertical bore 134 and a peg 156 sits in the bottom of the groove 158. Whenever it is necessary to unlock the panel 16 from the tractor 10, the panel 16 is swung open exposing the hinge mechanism mounted on the inner side of the panel 16. The finger tab 152 must be raised upwardly until the peg 156 is removed from the groove 158 and placed on top of the cylinder 144. Since the pin is no longer housed within the bore 134 the panel 16 is free to be removed from its locking position.

The self-locking portable panel can be utilized on any motor vehicle having an engine compartment or it may have other applications, wherein it is necessary to have a quick and easy access to service elements disposed behind such a panel. For example, the engine compartment service under normal conditions will easily be accomplished by unlatching the latch 22 at the second end 20 thereby letting the panel 16 to swing open and allowing to service the engine compartment components, such as oil lever gauge, fuel filters, oil filters, etc. If the tractor is equipped with fertilizer tanks, a loader or any other implement that prevents the panel from swinging open, the hinge can be disengaged. This would allow a removal of the panel in order to have an access to the compartment without dismounting the afore-mentioned obstacles, such as implements, loader or tanks. Conversely, the panel can be reconnected easily by applying pressure to the snap hinges, and then relatching another end of the panel.

The foregoing description and drawings merely illustrate the preferred embodiment and the invention is not limited thereto, except insofar as the appended claims are so limited, and so those skilled in the art who have the disclosure before them will be able to make modifications and variations therein without departing from the scope of the invention.

What is claimed is:

1. In a motor vehicle having a hood wall and a panel opening therein being coverable by a portable panel;

said panel releasably secured to said hood wall by at least one disconnectable hinge mechanism at a first end of said panel, and a second end thereof being able to swing about said mechanism;

said panel having an inner side facing the interior of said hood;

said hinge mechanism comprising one fixed part with aligning means to receive and coact with another mechanism part for facilitating the swinging movement of said panel about said fixed part;

said another mechanism part comprising a rotatable finger tab element being spring-loaded and guidable by said aligning means into a locking engagement with said fixed part; and said hinge mechanism being self-lockable by said finger tab upon an impact thereof by said panel, thereby automatically coupling said panel to said hood wall.

2. The invention according to claim 1; and said second end comprising a latch assembly for releasable attachment thereof to said hood wall.

3. The invention according to claim 2, and said portable panel comprising a center portion being partially offset from absolute coplanarity with said hood wall, thereby simulating an air scoop in said second end;

said second end of said panel enclosing said center portion offset and covering an access to said latch mounted on said inner side of said panel and concealed from outside view behind said panel and said second end offset;

and said hinge mechanism being disposed within the periphery of said first end and essentially concealed from outside view behind said panel in a closed position.

4. The invention according to claim 1, and said finger tab element being spring-loaded and rotatable about its axis; and said hinge mechanism comprising biasing means urging said finger tab element to lockingly engage with said fixed part;

another hinge mechanism disposed in series with said hinge mechanism at said first end of said panel.

5. The invention according to claim 1, and said aligning means comprising a recess ramp leading to a bore for said finger tab.

6. The invention according to claim 2, and said latch comprising a pair of spring-loaded plates reciprocably moveable in opposite directions and lockingly coacting with respective keepers upon pressure or impact applied thereto.

7. The invention according to claim 1, and said hinge mechanism disengagement and subsequent panel removal being carried out by virtue of pressure application to said finger tab, thereby releasing said mechanism locking engagement.

* * * * *